Patented Oct. 26, 1937

2,097,136

UNITED STATES PATENT OFFICE 2,097,136

ESTERS OF 2,4-DINITRO-6-CYCLOHEXYL-PHENOL

Frank B. Smith and Winfield Sunderland, Midland, Mich., assignors to The Dow Chemical Company, Midland, Mich., a corporation of Michigan No Drawing. Application February 25, 1937, Serial No. 127,764

6 Claims. (Cl. 260—103)

This invention is concerned with the mono-carboxylic acid esters of 2,4-dinitro-6-cyclohexyl phenol.

We have prepared members of the above new class of compounds, determined certain of their physical properties whereby they can readily be identified, and have found them useful as insecticides and particularly as toxics for inclusion in fly spray compositions.

These compounds are crystalline solids varying from pale yellow to orange in color. They are substantially insoluble in water but somewhat soluble in most organic solvents. They can be prepared by reacting a metallic salt of 2,4-dinitro-6-cyclohexyl phenol with suitable esterifying agents, e. g. mono-carboxylic acid anhydrides, acyl halides, etc.

In preparing the new compounds above described we generally form a suitable metallic salt of 2,4-dinitro-6-cyclohexyl phenol, e. g. a sodium or silver salt, react the latter with an esterifying agent, and thereafter separate the desired ester compound from the reaction mixture by recrystallization from an organic solvent. The metallic phenolate and esterifying agent are mixed together and the reaction carried out at a temperature not in excess of the refluxing temperature of the mixture. Since the reaction is frequently violent, it is preferable to add the esterifying agent portion-wise to the phenolate and to cool the mixture during such addition. The reaction mixture is then warmed to its refluxing temperature to insure complete reaction, and poured into an excess of a water-ice mixture. The resulting crude product is recrystallized from suitable organic solvents, e. g. petroleum ether, petroleum ether-propylene chloride mixtures, normal-propanol, etc. If desired, the solution may be clarified by treatment with bone-charcoal or other color absorbent prior to crystallization. Where the reaction is unduly vigorous, an inert organic solvent, e. g. chloroform, carbon tetrachloride, etc., may be employed as diluent. In such instance the crude reacted mixture is filtered, washed with water, and the solvent medium removed by evaporation prior to purification by crystallization.

The following examples describe in detail the preparation of certain individual members of our new class of compounds, but are not to be construed as limiting the invention:

Example 1

51.3 grams of sodium 2,4-dinitro-6-cyclohexyl phenolate tetra-hydrate, and 76.5 grams of acetic anhydride were mixed together at room temperature. The resulting spontaneous reaction caused an increase in the temperature of the mixture to 89° C. As the temperature began to fall the mixture was heated to its refluxing temperature for about 10 minutes and thereafter poured over 300 grams of ice, whereby the ester product solidified. This aqueous mixture was filtered and the residue obtained thereby washed and dried. The latter was dissolved in a hot mixture of petroleum ether and propylene chloride, clarified with bone-charcoal, filtered, and cooled, whereby there was obtained 32.4 grams of 2,4-dinitro-6-cyclohexyl-phenyl acetate in the form of light yellow crystals, melting at 93.5°–94.5° C.

Example 2

280 grams of the silver salt of 2,4-dinitro-6-cyclohexyl phenol were suspended in 550 milliliters of carbon tetrachloride. 109.5 grams of benzoyl chloride were dissolved in 200 millimeters of carbon tetrachloride to form a solution which was added portion-wise and with agitation to the silver salt suspension. The reaction mixture was then refluxed for one-half hour, and subsequently filtered hot to remove the silver chloride. The major portion of the carbon tetrachloride was removed from the filtrate by evaporation on a steam bath and the residue was cooled and filtered to obtain 239 grams of a crude ester product. This material was recrystallized from carbon tetrachloride, whereby there was obtained 194.2 grams of substantially pure 2,4-dinitro-6-cyclo-hexyl-phenyl benzoate as light yellow octahedral crystals melting at 128°–129° C.

Example 3

9.4 grams of silver 2,4-dinitro-6-cyclohexyl-phenolate were suspended in 25 milliliters of carbon tetrachloride, and a solution of 3.0 grams of chloro-acetyl chloride in 10 milliliters of carbon tetrachloride added thereto. The resulting reaction mixture was refluxed for 15 minutes, filtered hot, and the carbon tetrachloride removed therefrom by evaporation on a steam bath. The residue was dissolved in a hot petroleum ether-propylene chloride mixture, treated with bone-charcoal, filtered, and cooled, whereby a crude ester product was obtained as a yellow, crystalline mass. Upon repeated recrystallization, 5.5 grams of 2,4-dinitro-6-cyclo-hexyl-phenyl chloro-acetate was obtained as an almost colorless product melting at 97°–98° C.

In a similar manner, esterifying agents such as propionic acid anhydride, butyryl chloride, phenyl-acetyl chloride, and methyl benzoyl chloride may be reacted with the metal salts of 2,4-dinitro-6-cyclohexyl phenol to form the corresponding ester compounds. Among the esters so prepared are 2,4-dinitro-6-cyclohexyl-phenyl propionate, 2,4-dinitro-6-cyclohexyl-phenyl chloro-propionate, 2,4-dinitro-6-cyclohexyl-phenyl butyrate, 2,4-dinitro-6-cyclohexyl-phenyl alpha-toluate, 2,4-dinitro-6-cyclohexyl-phenyl (2-methyl-benzoate), etc.

Representative members of the above described group of compounds have been tested by the Peet-Grady method as described in Soap, 8, No. 4, 1932, and found to be particularly valuable as fly spray toxics. For example, a 1 per cent kerosene solution of 2,4-dinitro-6-cyclohexyl-phenyl acetate was found to give an 89 per cent knock down and a kill of over 62 per cent in 24 hours when tested against house flies. A 1 per cent kerosene solution of 2,4-dinitro-6-cyclohexyl-phenyl benzoate gave a knock down of over 51 per cent of the flies contacted therewith when tested in a similar manner.

Other modes of applying the principle of our invention may be employed instead of those explained, change being made as regards the materials employed, provided the products described in the following claims be thereby obtained.

We, therefore, particularly point out and distinctly claim as our invention:

1. A mono-carboxylic acid ester of 2,4-dinitro-6-cyclohexyl phenol.
2. A mono-carboxylic aliphatic acid ester of 2,4-dinitro-6-cyclohexyl phenol.
3. A mono-carboxylic aromatic acid ester of 2,4-dinitro-6-cyclohexyl phenol.
4. 2,4-dinitro-6-cyclohexyl-phenyl acetate.
5. 2,4-dinitro-6-cyclohexyl-phenyl benzoate.
6. 2,4-dinitro-6-cyclohexyl-phenyl chloro-acetate.

FRANK B. SMITH.
WINFIELD SUNDERLAND.